Figure 1:
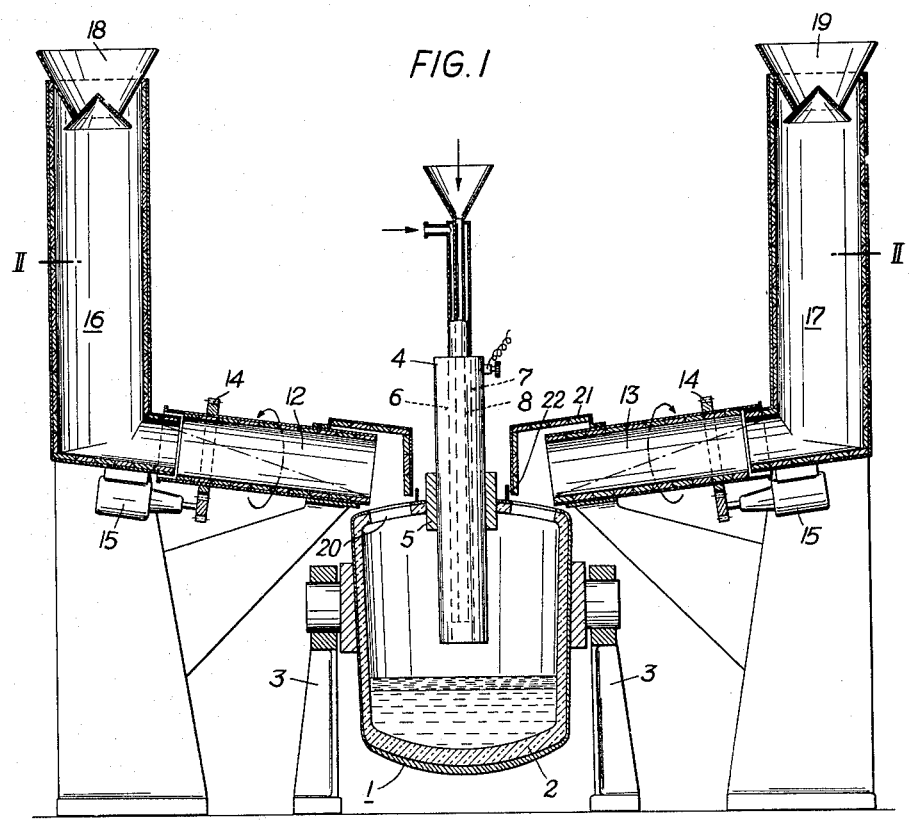

INVENTOR.
RUDOLF RINESCH

Dec. 29, 1964 R. RINESCH 3,163,521
PROCESS AND APPARATUS FOR THE RECOVERY OF LIQUID
IRON BY REACTING IRON OXIDE ORE
Filed July 30, 1962 2 Sheets-Sheet 2

INVENTOR.
RUDOLF RINESCH
BY
ATTORNEYS

United States Patent Office 3,163,521
Patented Dec. 29, 1964

3,163,521
PROCESS AND APPARATUS FOR THE RECOVERY OF LIQUID IRON BY REACTING IRON OXIDE ORE
Rudolf Rinesch, Linz, Austria, assignor to Vereinigte Osterreichische Eisen- und Stahlwerke Aktiengesellschaft, Linz, Austria, a company of Austria
Filed July 30, 1962, Ser. No. 213,540
Claims priority, application Austria, Aug. 2, 1961, 5,982/61
6 Claims. (Cl. 75—11)

This invention relates to a process for the recovery of liquid iron by reacting iron oxide with a reducing gas in a reduction zone and melting the reduction product in a combined melting and gas production zone.

Various methods have already been proposed for the recovery of liquid iron by direct reduction of iron oxide, with the object to eliminate the use of the conventional blast furnace. The blast furnace process, which hitherto has always been regarded as the most economic method for the production of liquid iron, involves various momentous disadvantages, which become more and more important in recent times:

In the highly industrialized countries in which the metallurgical centers are concentrated, the lack of coking coal is becoming critical. High-quality coking coal which upon coking yields metallurgical coke of sufficient hardness to withstand the pressure of blast-furnace charging has become rare, and the expenses on coke constitute the main financial burden in the operation of a blast-furnace.

Newly developing countries that begin to industrialize and wish to build up an iron industry on rich ore resources likewise search for a substitute for the blast furnace process, which is heavily burdened financially by extraordinarily high investments in equipment, especially since also in those countries the coke problem is the most difficult handicap to be overcome.

Another disadvantage of the blast-furnace process resides in that no finely divided ore can be used, because this would not withstand the pressure of blast-furnace charging. The ore has to be previously sintered and solidified, which causes additional expenditures of time and labour. Finally it has to be remarked that the crude iron recovered in the blast furnace process has to be subjected to a further treatment for the production of steel, in order to obtain a product suitable for technical use.

The methods proposed for the direct reduction of iron oxide include the following main groups:

(a) The production of iron sponge at moderate and low temperatures (500 to 1100° C.);
(b) The production of iron bloom at temperatures between 1250 and 1400° C.;
(c) The production of liquid iron immediately from the ore, without the crude iron stage.

The methods mentioned under (a) mostly use rotary kilns or shaft furnaces, employing various kinds of solid fuels and combustible gases as reducing agents. Among the processes utilizing gaseous reducing agents, so far only the so-called Wiberg process has been realized on a technical production scale; the product so obtained is comparatively impure, however, and in general can be used only as synthetic scrap or the like.

Also the processes mentioned under (b) for the production of iron bloom are carried out in rotary kilns. The major drawback of these processes, which are also called bloomery hearth processes, is their poor production capacity and the limited life of the refractory lining in the bloom formation zone of the furnace.

The third group of methods mentioned under (c), which type includes also the instant process, constitutes the beginning of a promising development. Known methods in this field include the so-called cyclone process in which pulverulent iron ore is heated to a high temperature with the aid of hot gases in special chambers and is then transferred into a reactor having water-cooled walls and bottom. Coal dust and oxygen are supplied to the reactor through separate apertures. Using an excess of reducing gases, high temperatures can be attained by a controlled combustion of the fuels, whereby the ore particles introduced into the reactor are reduced, melted and refined by removing slag and gangue by centrifugation.

Another process has further been proposed in which a reducing gas is produced in a combined melting and gas production zone by the combustion of fuels with air or oxygen, which reducing gas is introduced into a subsequent reduction zone in counterflow to sinking iron ore particles. This process has the disadvantage that in the combined melting and gas production zone unduly large amounts of fuel and oxygen have to be used in order to obtain the thermal conditions required for the melting and reducing process. The chemical utilization as a reducing agent of the coal supplied, therefore, is poor, and the waste gas contamination very high. In order to avoid this disadvantage, it has also been proposed to generate in the melting and gas production zone a gas having oxidizing properties, treating it in a subsequent conversion zone by adding computed amounts of coal and oxygen to render it reducing, whereupon in a subsequent reducing zone this gas will react with the iron ore in counterflow. Frequently it is also necessary to add coal to the iron ore to provide for the required reducing conditions. The composition of the gases is subject to precise adjustment and control in all stages. In addition, the intermediate conversion zone requires a purification of the gas by means of washers, the heat balance being deteriorated by cooling the gas before the purification and re-heating it prior to the reduction.

The object of the instant invention is to avoid these difficulties and disadvantages. In particular, it is an object of the invention to provide a simple process which is easily operated and which permits ample variation of the composition of the gases and, accordingly, of the course of the metallurgical reactions.

Also according to the invention simple apparatus for carrying out the process, which enable a continuous or discontinous operation and which require modest capital investment in equipment, are provided.

The process according to the invention for the recovery of liquid iron, which comprises reacting iron oxide with a reducing gas in a reduction zone and melting the reduction product in a combined melting and gas production plant, consists in that in the melting and gas production plant which is provided with an additional heating a gas having reducing properties is generated by burning carbonaceous material with an oxygen-containing gas, preferably pure oxygen, and, if desired, by the thermal decomposition of water, which reducing gas is supplied directly to the conversion zone, i.e., without an intermediate conversion zone, the combustion of the carbonaceous material being controlled in such manner that the major portion of the carbon supplied is utilized for the chemical reduction of the iron oxide, the heat required for the melting process being furnished by an additional heating of the melting zone.

The method according to the invention thus aims at the production of carbon monoxide in the first stage, which, as everybody knows, may be accomplished by the incomplete combustion of the carbon contained in the fuel. At the combustion of carbon with pure oxygen to CO temperatures up to 2700° C. are generated in the combustion zone. At 1200° C., 1818 standard cubic meters CO are required for producing 1000 kg. of iron (Fe) from $Fe_2O_3$, 67% CO being in the equilibrium state with 33% $CO_2$ at this temperature. At 300° C. 19.45% CO are in equilibrium with 80.55% $CO_2$. Hence follows, that the temperature of 2700° C. generated in the combustion zone is too high for ensuring optimum conditions in the reduction zone, and this temperature is suitably decreased by introducing water or steam into the combustion zone. For decreasing the combustion temperature from about 2700° C. to about 1650° C., 20 to 25 percent by volume (computed from the amount of CO generated at the combustion of carbon with pure oxygen—970 standard cubic meters per 1000 kg. Fe=100%) of steam are introduced into the combustion zone. The mentioned amount of CO is sufficient for reducing a total of 1000 kg. Fe in the temperature range between 1200 to 300° C. (end of the reduction zone). The thermal decomposition of the steam in the presence of coal according to the equation

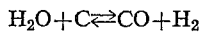

is endothermic, a mixture of steam, CO and $H_2$ being formed. At an increase of temperature this equilibrium is shifted almost completely towards the right side. The $H_2$ content of this reducing gas then amounts to 10 to 11%.

The reduction of $Fe_2O_3$ with pure $H_2$ is endothermic up to temperatures of 1150° C., and slightly exothermic at higher temperatures, while the reduction with pure CO is exothermic in the entire temperature range coming into question. At the temperature of 300° C. prevailing at the end of the reduction zone nearly all of the fuel supplied is utilized as a chemical reducing agent, leaving a rest of about 20% CO. At low temperatures the CO is present in the form of a metastable substance and is completely permanent. Since it is more favourable to realize endothermic reactions at a higher temperature than at a lower temperature (with exothermic processes the temperature conditions are reverse), it is of advantage to carry out the reduction with $H_2$ at higher temperatures and with CO at lower temperatures.

Thermochemical considerations show that the reduction of the iron oxide with a mixture of 17 to 20% $H_2$ and 80 to 83% CO is almost independent of temperature, i.e., the reducing action of this mixture of gases is almost the same at higher and at lower temperatures.

In order to raise the $H_2$ content from 11% to 17 to 20%, an additional amount of water or steam is required, which, however, would cause an undesirable temperature loss. This temperature loss is compensated, according to the invention, by additional electric heating, so that again temperatures of about 1650° C. are obtained.

Instead of steam also methane may be introduced into the combustion zone, methane reacting according to the equation: $CH_4+CO_2 \rightleftharpoons 2CO+2H_2$ with the $CO_2$ generated during the cobustion, to form again a mixture of CO, $H_2$, $CH_4$ and $CO_2$.

As has been mentioned hereinbefore, it is an essential feature of the present invention to heat the melting and gas production plant to melting temperature by an additional heating, that is to say, without undue consumption of fuel and, accordingly, without the production of excessive amounts of gas. Preferably the additional heat required for the melting of the reduction product is supplied in the form of electric energy by means of an electric arc heating. The use of Soderberg or graphite electrodes, which extend into a closed melting chamber from above, is preferred. It is also possible, however, to operate with a bottom electrode and one electrode introduced from above.

The carbonaceous material used for the production of the reducing gas may be of any kind. Beside high-class coking coal also poor coals, oil, hydrocarbon gases or mixtures thereof may be used. Damp fuels may be used with advantage, the water contained in the fuel being thermally decomposed according to the reactions mentioned above. The moisture content of the fuel is taken into account in rating the amount of water or steam to be added. As an oxygen-delivering gas pure oxygen or oxygen-enriched air is preferred in order to keep the nitrogen ballast at a minimum. When coal having, e.g., a natural moisture content is used, combustion of the carbon with pure oxygen into CO and conversion of the moisture contained in the coal into CO and $H_2$, at the temperatures above 800° C. prevailing in the gas production zone, yields a reducing gas consisting of about 84.1% CO and 15.9% $H_2$. The desired higher content of hydrogen in the reducing gas of about 20% is achieved by the introduction of additional steam, which may be supplied together with the oxygen.

Owing to the adjustability of the amounts of carbon and oxygen added, on the one hand, and to the possibility of optional adjustment of the temperature by electric heating, on the other hand, it is possible in a simple manner to regulate the composition of the reducing gas and adjust optimum conditions in the reduction zone. In general, the reduction product entering into the melting zone will contain a minor portion of non-reduced iron oxide, due to equilibrium relations. This iron oxide is reduced indirectly by the carbon dissolved during the melting process, and by the combination of direct and indirect reduction it is possible, according to the invention, to obtain a final product having any desired carbon content. The conditions in the melting zone will then be similar to those prevailing in an electric shaft furnace. By addition of coal the iron oxide can be reduced in the melting zone before or after being melted.

By a suitable rating of the amounts of coal added the instant method also allows optional adjustment of the carbon content of the reduction product melted in the melting zone.

The process may be carried out continuously or discontinuously. In a continuous operation one tap hole each for the slag and for the melted product is provided, and these products are withdrawn from time to time, while reducing conditions are maintained in the melting zone.

When the process is carried out discontinuously, the production of the reducing gas is interrupted after the individual reduction phases and the connection of the melting zone with the reduction zone shut. In the melting zone now is a product containing dissolved carbon, which product may be refined in a similar manner as in the known surface-blowing processes by adjusting an oxidizing atmosphere in the melting zone, preferably by top-blowing an oxygen jet.

The process according to the invention and the apparatus for carrying out the same are explained more fully in the accompanying drawing.

Figure 2:
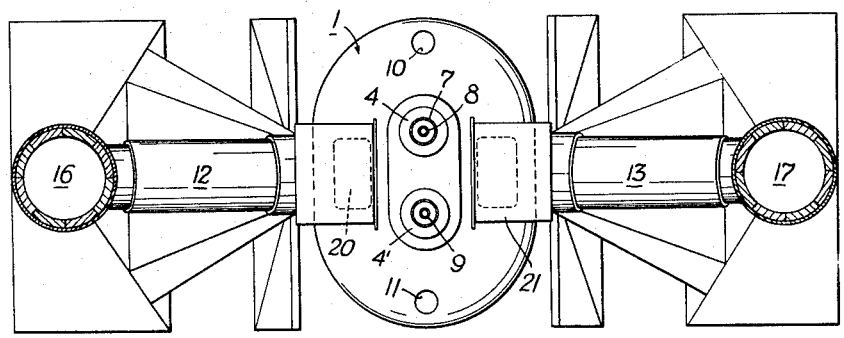
Figure 3:
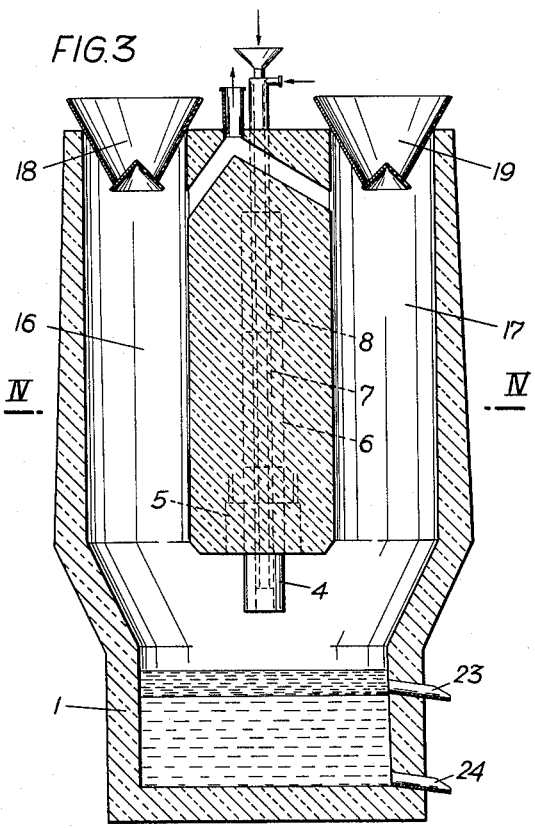
Figure 4:
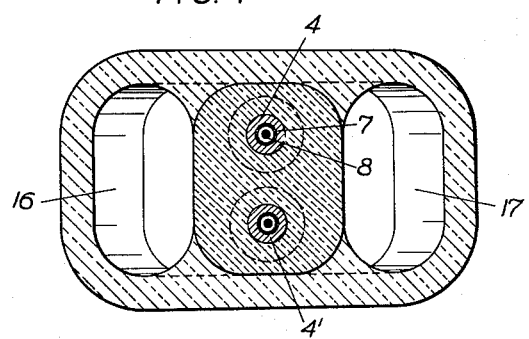

FIGS. 1 and 2 show a front view and a plan view of a melting and gas production vessel with adjoining reduction towers. FIGS. 3 and 4 illustrate a modified embodiment.

In FIG. 1 numeral 1 designates a closed melting and gas production vessel which has a substantially elliptical cross section and is provided with a refractory lining 2. The vessel is carried on a carrying construction 3 to be tiltable. Through the top wall of the vessel two Soderberg or graphite electrodes 4 and 4' are inserted, one or both of which have a central bore. In the region where the electrodes pass through the top wall of the vessel, they are surrounded by a cooling cylinder 5. A device for supplying fuel and comburent gas, which consists of concentric tubes 7, 8, may be inserted to be lifted and lowered in the bore 6 of the electrode 4. Through the inner tube 8, e.g., pulverulent coke or coal may be supplied, and through the jacket space between the inner tube 8 and the outer tube 7 oxygen may be introduced. Also the reverse arrangement is possible. Steam or water may be supplied with the oxygen. An auxiliary supply device, which is designated by 9, may be provided in the bore of the second electrode. 10 and 11 designate tap holes.

Joined to both sides of the elliptical vessel 1 are rotating drums 12 and 13, which terminate above the charging apertures 20 of the top wall of the vessel and are sealed gastight by means of covers 21, 22. The drums 12 and 13 may possess a tooth wheel rim 14, which is driven by a motor 15. The drums are provided with a refractory lining. Their arrangement, i.e., their inclination towards the horizontal line, is such that the granular reduction product cannot be conveyed through the drums by the action of gravity, but will fall into the melting vessel only when the drums are rotated.

Joined to the two drums are refractory-lined reduction towers 16 and 17, which are filled with granular iron ore up to the top. At the top end of the towers feeding devices 18 and 19 are arranged.

Instead of the tiltable arrangement of the vessel 1 in the carrying construction 3 the whole vessel may be carried on a tilting structure.

The process is preferably carried out in the following manner: After having filled the reduction towers 16 and 17 with iron ore, coke is supplied to the melting chamber and the electric heating switched on. Then oxygen and fuel are blown in and the melting chamber heated (suitably under oxidizing conditions) until the reduction towers and the iron ore are heated to a temperature of 200 to 300° C. below the reduction temperature required. Then carbon monoxide is produced by a control of the combustion in the gas production zone, i.e., by supplying an excess of carbon, whereupon a mixture of about 75 to 85% CO and 25 to 15% $H_2$ is produced by introducing steam, as has been mentioned hereinbefore. The reducing gas passes upwards through the reduction towers and starts to reduce the iron ore. After starting the rotation motor for the drums 12 and 13, the reduced product spills over into the melting vessel. The reduction product is now melted down with the aid of the electric heating. The small portion of non-reduced iron oxide obtained is reduced indirectly by the carbon dissolved, the usual temperature loss accompanying this endothermic process being compensated by the electric heating.

The apparatus shown in FIGS. 1 and 2 is destined for a discontinuous operation. As soon as the melting vessel is filled up to about one-third, the production of the reducing gas is interrupted and the rotation motor of the drums stopped. From now on, no further reduction product can fall into the melting vessel. By top blowing an oxygen jet through one of the supply tubes the melted C-containing product is refined, admixtures being added, if desired. Subsequently the steel and the slag are poured out by tilting the vessel, whereupon the next reduction phase may be carried out as described. As the refining process carried out between the reduction phases requires only a few minutes (about 10 minutes) and also delivers heat, the iron ore in the reduction towers is kept at reduction temperature, and the next reduction phase may be started immediately.

FIGS. 3 and 4 show a modified embodiment, which is particularly destined for continuous operation of the process. The melting vessel 1 is stationary and has a tap hole 23 for the slag and a tap hole 24 for the melted reduction product. The connection of the melting chamber 1 with the reduction towers 16, 17 is likewise stationary, without the provision of intermediate drums. 4 and 4' again designate hollow electrodes, and 7, 8, 9 are concentric supply conduits for fuel, comburent gas and steam or $H_2O$, which conduits are arranged within the electrodes. The concentric conduits may be surrounded by a cooler, as indicated in FIG. 3.

The beginning of the process is carried out in the same manner as explained in conjunction with FIGS. 1 and 2, that is to say that after heating the reduction towers with an oxidizing gas, carbon monoxide is formed by the combustion of an excess of carbon with oxygen, and a mixture of carbon monoxide and water is produced by introducing steam. By the time the melted reduction product has collected in the melting vessel, after the reduction has starter, the liquid iron produced and the slag are tapped continually or intermittently.

The method according to the invention is explained more in detail by way of the following example:

EXAMPLE

Marampa ore concentrate having the following analysis: 91.6% $Fe_2O_3$, 0.29% $Mn_2O_3$, 3.8% $SiO_2$, 0.37% CaO, 0.020% S, 3.64% $Al_2O_3$, 0.22% MgO, and 0.032% $P_2O_5$, was used as a starting material. This ore was charged into the reduction towers of a plant of the type illustrated in FIG. 1. An initial amount of 600 kg. of coke in lumps was charged into the melting vessel having a capacity of about 20 tons, which is in gastight connection with the reduction towers. Then the electrodes were electrically connected with the charged coke and the electric heating switched on. As soon as the coke glowed, oxygen of 99.5% purity was blown through the supply conduit and through the annular space between inner tube and outer tube, until about half of the charged coke was burnt into $CO_2$. Due to the high combustion temperature, the plant consisting of melting vessel, drums and towers was heated to reduction temperature, an oxidizing atmosphere being maintained.

As soon as the desired temperature of about 1500° C. was attained in the melting vessel, coking coal having a natural moisture content and assaying for 77.1% C, 4.98% H, 1.81% S, O, N, 9.30% $H_2O$, 6.8% ash was introduced through the inner tube. Through the jacket space pure oxygen was blown in such an amount that a reducing atmosphere, i.e., an excess of carbon, was adjusted. The moisture contained in the coal was decomposed thereby to CO and $H_2$.

As has been mentioned hereinbefore, a proportion of CO to $H_2$ of about 78 to 80% CO to 20 to 25% $H_2$ is most favourable from the thermochemical standpoint. Therefore, in order to obtain this proportion, 230 kg. of water was added per 1000 kg. natural moisture coal. The water was supplied in the form of liquid water together with the oxygen jet. After blowing in this additional water, the reducing gas had a composition of 79.5% CO and 20.5% $H_2$.

The combustion temperature should theoretically be 1570° C., but was 1400° C., due to heat dissipation. The lack of heat was compensated by electric heating and the temperature adjusted to 1650° C. The quantity of reducing gas was 1022 standard cubic meters per 1000 kg. iron and consisted of 814.6 standard cubic meters CO and 207.4 standard cubic meters $H_2$.

The evolved gas passed from the gas production and melting vessel through the rotary drums and the reduction shafts filled with iron ore. As soon as the reduction had started, the rotary drums were set going and moved at a constant speed. This caused a uniform downward motion and uniform reduction of the ore. The reduction product spilled over into the melting vessel and was melted under the action of the electric heating. Sampling of the reduction product at the end of the rotating drums, before the reduction product fell into the melting vessel, showed that 90% of the original $FE_2O_3$ had been reduced to Fe. The remaining iron oxide was reduced indirectly by carbon dissolved in the liquid bath.

The product melted in the melting vessel had the following composition: 0.35% C, 0.20% Mn, 0.45% Si, 0.040% S, 0.015% P; and the slag had the following composition: 2.84% FeO, 0.74% $Mn_2O_3$, 31.38% $SiO_2$, 31.50% CaO, 0.17% S, 31.25% $Al_2O_3$, 1.95% MgO, 0.17% $P_2O_5$.

The waste gas escaping at the upper end of the towers had a temperature of 315° C. and the following composition: 39.3% CO, 40.7% $CO_2$, 9.9% $H_2$, 10.1% $H_2O$. This gas still had a high calorific value. It may be used for steam generation or for sintering iron ore.

If pure CO is used for the reduction instead of the described mixture of reducing gases consisting of CO and $H_2$, the effluent gas has a temperature of 300° C. and a composition of 19.45% CO and 80.55% $CO_2$. In this case the utilization of the coal as a reducing agent is better, but the reducing effect and the speed are lower, since the reduction of CO is dependent on temperature, whereas the reduction with the mixture of gases described is almost independent of the temperature. For these reasons, the above-described mode of working using the mixture of gases is preferred.

The silicon content of 0.45% in the reduction product may be removed by top-blowing pure oxygen for a short time, the carbon content being reduced to a value of 0.10% at the same time.

The heat and material balance in this mode of working is as follows.

```
Heat gain:                                                          Cal.
  For   989.60 kg.
        —98.96 kg.
        ─────────
        890.64 kg.
  Fe per ton of steel taking into account the moisture intro-
    duced and conversion of same to H₂ and Co_____  802.027
                                                            ═══════
Heat consumption:
  Reduction of 141.34 kg. Fe₂O₃ to 98.96 kg. Fe_____  100.543
  Reduction of Mn₂O₃ to 2 kg. Mn_____    2.668
  Reduction of SiO₂ to 4.5 kg. Si_____   24.827
  Reduction of P₂O₅ to 0.15 kg. P_____     .562
  Reduction of Fe to Fe₃C with 3.50 C_____    1.575
  Heat content of the liquid steel_____  270.600
  Heat content of the waste gas_____  122.640
  Heat content of the liquid slag_____  120.400
  Heat losses (~17.5%)_____  140.354
                                                           ───────
                                                           784.169

Heat remaining available_____  17.858
  802.027 cal.
  —784.169 cal.
  ────────────
   17.858 cal.

Additional heat for maintaining the temperature at 1,650° C____ 121.000
Electric energy required:
  121.000 cal.
  —17.858 cal.
  ────────────
  103.142 cal. = 103.142/860 = 120 kilowatt hours per ton of steel.
```

Total consumption: 570 kg. natural moisture coal per 1 ton of steel, 120 kilowatt hours.

*Material Balance*

| Sintered Ore | Kg. | Steel | Kg. | Slag | Kg. | Gas | Kg. |
|---|---|---|---|---|---|---|---|
| $Fe_2O_3$ | 1,413.4 | Fe | 989.6 | FeO | 6.10 | $O_2$ | 430.22 |
| $Mn_2O_3$ | 4.5 | Mn | 2.0 | $Mn_2O_3$ | 1.59 | | |
| $SiO_2$ | 58.6 | Si | 4.5 | $SiO_2$ | 67.29 | | |
| CaO | 5.7 | | | CaO | 67.59 | | |
| S | 0.3 | S | 0.25 | S | 0.37 | | |
| $Al_2O_3$ | 56.2 | | | $Al_2O_3$ | 67.05 | | |
| MgO | 3.4 | | | MgO | 4.17 | | |
| $P_2O_5$ | 0.5 | P | 0.15 | $P_2O_5$ | 0.37 | | |
| | 1,542.6 | | | | | | |
| Admixtures: Lime— | | | | | | | |
| CaO | 60.0 | | | | | | |
| Coal | 570.57 | C | 3.50 | | | C | 436.41 |
| | | | | | | $H_2$ | 28.30 |
| | | | | | | $H_2O$ | 53.37 |
| Slag content. | 38.8 | | | | | S,O,N | 10.33 |
| | 2,173.12 | | 1,000 | | 214.49 | | 958.63 | duction product, transferring the reduction product into the gas production and melting zone, and supplying heat to supplement the heat produced by combustion of the carbonaceous material to melt the reduction product in the gas production and melting zone.

2. A method of producing liquid iron in a furnace having a combined gas production and melting zone and a reduction zone, comprising the steps of burning a carbonaceous material with an oxygen-containing gas in the gas production zone, the amount of oxygen in the gas being insufficient for complete combustion of the carbon, to produce a gas containing a major proportion of CO, supplying $H_2O$ to the gas production and melting zone to produce a reducing gas having a temperature of about 1650° C., and containing from about 75% to about 85% CO and from about 25% to about 15% $H_2$, charging a solid iron oxide ore into the reduction zone, supplying the reducing gas to the reduction zone to reduce the iron oxide and form a reduction product, supplying the reduction product to the gas production and melting zone, and electrically heating the reduction product therein.

3. A method according to claim 2, wherein the carbonaceous material is selected from the group consisting of solid fuels, liquid fuels and gaseous fuels.

4. A method of producing liquid iron in a furnace having a combined gas production and melting zone and a reduction zone, comprising the steps of burning a carbonaceous material with an oxygen-containing gas in the gas production and melting zone, the amount of oxygen in the gas being insufficient for complete combustion of carbon, to produce a gas having reducing properties, charging a solid iron oxide ore into the reduction zone, supplying the reducing gas directly to the reduction zone to reduce the iron oxide and form a reduction product, supplying the reduction product to the gas production and melting zone, and electrically heating the reduction product therein in the presence of free carbon to melt the iron oxide and produce a melted product having a predetermined carbon content.

5. A method of producing steel in a furnace having a combined gas production and melting zone and a reduction zone, comprising the steps of burning a carbonaceous material with an oxygen-containing gas in the gas production and melting zone, the amount of oxygen in the gas

What I claim is:

1. A method of producing liquid iron in a furnace having a combined gas production and melting zone and a reduction zone, comprising the steps of burning a carbonaceous material with an oxygen-containing gas in the gas production and melting zone, the amount of gas being insufficient for complete combustion of carbon in the carbonaceous material, to produce a gas having reducing properties, charging solid iron oxide ore into the reduction zone of the furnace, supplying the reducing gas from the gas production and melting zone directly to the reduction zone to reduce the iron oxide and form a rebeing insufficient for complete combustion of carbon to produce a gas having reducing properties, charging a solid iron oxide ore into the reduction zone, supplying the reducing gas directly into the reduction zone to reduce the iron oxide and form a reduction product, supplying the reduction product to the gas production and melting zone, electrically heating the reduction product in the presence of free carbon to melt the reduction product and to obtain a melted product having a predetermined carbon content, terminating the supplying of the reducing gas to the reduction zone and the supplying of the reduction product to the gas production and melting zone, and treating the melted product in the gas production and melting zone with oxidizing gases to convert it into steel.

6. Apparatus for producing liquid iron, comprising a closed refractory-lined vessel having a combined gas production and melting chamber at the lower end thereof, a partition extending downwardly from the top of said vessel to a point spaced from the bottom of said vessel and adjacent said chamber, said partition defining with opposite walls of the vessel a pair of space-apart reduction towers communicating with said chamber, means for supplying solid iron ore to said reduction towers, electrode means on said partition extending onto said chamber, first passage means through said partition for supplying a carbonaceous material to said chamber, second passage means through said partition for supplying an oxygen-containing gas to said chamber, third passage means through said partition for supplying $H_2O$ to said chamber, means adjacent the bottom of said chamber for tapping liquid iron therefrom and means spaced from said first tapping means for tapping slag from said chamber.

References Cited by the Examiner

UNITED STATES PATENTS

| | | | |
|---|---|---|---|
| 1,370,915 | 3/21 | Riveroll | 75—34 |
| 1,391,507 | 9/21 | Riveroll | 75—12 |
| 1,422,733 | 7/22 | Bradley | 75—91 |
| 2,547,685 | 4/51 | Brassent | 75—35 |
| 2,750,277 | 6/56 | Marshall | 75—38 |
| 2,760,858 | 8/56 | Findlay | 75—84.5 |
| 2,919,983 | 1/60 | Halley | 75—38 |
| 2,928,730 | 3/60 | Luerssen | 75—38 |

DAVID L. RECK, *Primary Examiner.*